United States Patent Office 3,562,847
Patented Feb. 16, 1971

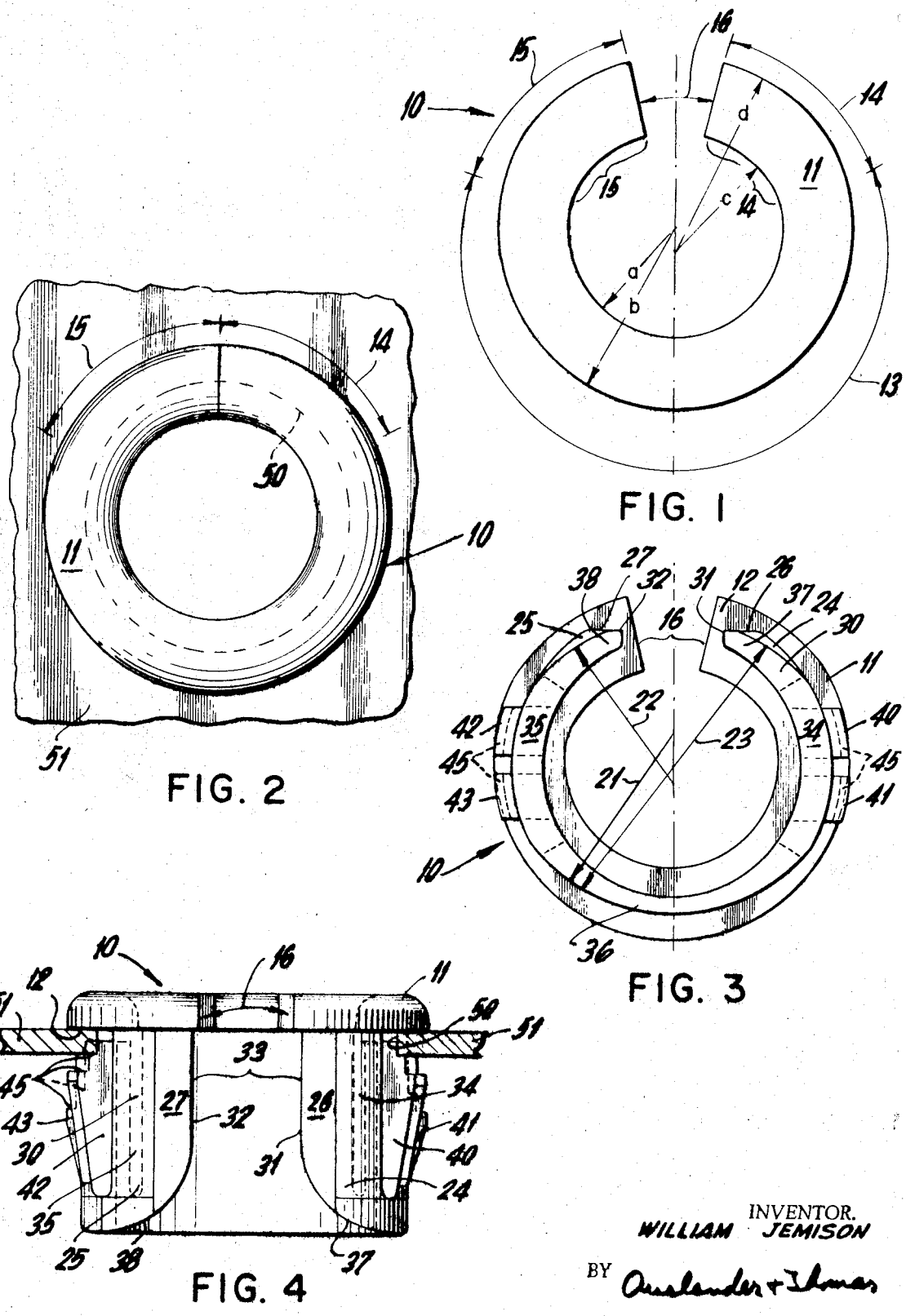

3,562,847
ROUND SPLIT BUSHING
William Jemison, Summit, N.J., assignor to Heyman Manufacturing Company, Kenilworth, N.J., a corporation of New Jersey
Filed Mar. 4, 1969, Ser. No. 804,132
Int. Cl. F16l 5/00
U.S. Cl. 16—2    21 Claims

ABSTRACT OF THE DISCLOSURE

A round split bushing having means to lock it in a round aperture in a panel, has a face flange and integral shank normally gapped open and flexible so that a wire may be inserted into the bushing. In squeezed together position the shank matches the aperture and guides itself into locking position. When fully inserted the face flange while not truly round gives the illusion of being round.

---

The present invention relates to an improved round bushing.

Wires, cables and hoses that extend through round openings in panels or housings are generally protected against abrasion or wear by bushings set into the panels or housings. Such bushings themselves usually, resiliently lock into the openings and surround the wire, cable or hoses, providing protective surface between the opening and wire, cable or hose.

The openings in most instances are usually drilled or punched in a selection of prescribed diameters.

In assembling a unit having wires, cable or hoses, it is not always convenient to be able to have all the openings preset within bushings locked into position. Sometimes it is necessary to have bushings inserted only at such times as wire, cable and hoses are set into a desired position. Where necessary bushings have been omitted in an assembly and there may be no way of getting a bushing into position without complicated disassembly; split bushings are a great convenience.

While not all bushings are exposed to general view once an assembly has been made, it has grown to be expected that a round aperture will have a round bushing to coincide the shape of the aperture. Where openings are exposed to general view, good workmanship and the public expect round openings to have corresponding bushings where bushings are used.

Where split bushings are used to lock into openings, it is also necessary that the split in the bushing be adequate to flex to accommodate the thickness of the wire, cable or hose that is used with such opening.

It has been a problem to find a general purpose, all use round split bushing because the split must be adapted to accommodate the selection of wire, cable or hose diameter which may be placed into the bushings and the bushings should not appear distorted once locked into an opening.

According to the present invention a split bushing is provided which gives a generally round appearance when it is locked into a panel opening, the bushing being split and adapted to flex to conveniently be placed around a selection of diameters of wire, cable or hose with a minimum of difficulty.

Although such novel feature or features believed to be characteristic of the invention are pointed out in the claims, the invention and the manner in which it may be carried out may be further understood by reference to the description following and the accompanying drawings.

FIG. 1 is a front elevation of a round bushing of the present invention in normal position.

FIG. 2 is a front elevation of a round bushing of the present invention engaged in an aperture.

FIG. 3 is a back elevation of the round bushing of the present invention in normal position.

FIG. 4 is a plan view of the round bushing of FIG. 3.

Referring now to the figures in greater detail, where like references numbers denote like parts in the various figures.

Figure 5:
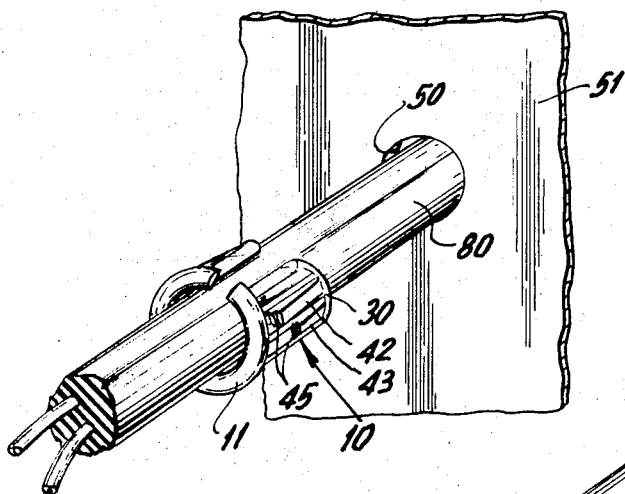
FIG. 5 is an exploded view of a bushing of the present invention being placed over a lead which passes through an aperture.

The round bushing 10 comprises a discontinuous face flange 11 and a discontinuous body shank 30. The body shank 30 as shown in FIGS. 3–6 has gripping fingers 40, 41, 42, 43 which are provided with shoulders 45. Thus, a bushing 10 inserted into an opening 50 locks itself into the panel 51 catching the thickness of the panel 51 between the inner surface 12 of the face flange 11 and the shoulders 45 on the gripping fingers 40, 41, 42, 43.

The face flange 11 in normal open position as shown in FIG. 1 comprises a major arc portion 13 of a circle. The width of the face flange 11 is defined by the distance between radii $a$ and $b$ from the center of the flange. The major arc portion 13 is about three quarters of a circle or sufficient to provide a roundish appearance when combined with the curved portions 14, 15 when the bushing 10 is engaged in the aperture 50. A first curved portion 14 is integrally blended into the major arc portion 13 at one end of said arc 13 and a second curved portion 15 is integrally blended into the other and major arc portion 13.

The curved portions 14, 15 are not necessarily pure arcs, but arc blended curves having radii such as $c$ and $d$ which are greater than the radii $a$ and $b$ of the major arc 13 and spaced apart the width of the face flange 11. The basic radii $c$ and $d$ or any plurality of radii which combine to form the first and second curved portions 14, 15 must be larger than the radii $a$ and $b$, thus in normal condition of the bushing 10 the discontinuity of the face flange 11 is defined by a gap 16 between the ends of the first and second curved portions 14, 15.

The larger radii of the first and second curved portions 14, 15 allows the flange face to be closed as shown in FIG. 2 with the ends of the first and second curved portions 14, 15 juxtaposed, substantially defining a circle as the first and second curved portions 14, 15 are brought together when the bushing is fully inserted into the aperture 50 in the panel 51. When inserted into the aperture 50 in the panel 51 the major arc portion 13 is slightly distorted but not sufficiently to destroy the substantial appearance that the face flange 11 is round.

In normal open position the larger diameter of the radii of the first and second curved portions 14, 15 extends them upward and outward and since they are measured to match the circumference of the aperture 50 they are spaced apart forming the gap 16. The total circumference of the major arc portion 13 and the first and second curved portion is directly related to the circumference of the aperture 50 to provide the gap 16 when the bushing 10 is in normal condition and to provide a close abutment of the first and second curved portions 14, 15 of the face flange 11 when the bushing 10 is inserted in the aperture 50.

The shank 30 is integral to the inner surface 12 of the face flange 11 and generally perpendicular thereto. The periphery of the shank 30 must be less than the periphery of the face flange 11 so that the wall of the panel 51 may be grasped and held between the inner surface 12 of the face flange 11 and the fingers 40, 41, 42 and 43 and the shoulders 45 or other grasp means.

The first shank edge 31 and second shank edge 32 define the discontinuity of the shank 30. The gap 16 in the flange 11 and the gap 33 between the shank edges 31, 32 are substantially contiguous.

In normal open position, the shank 30 may have walls 34, 35 of greater outer diameter than said aperture 50 and a wall 36 foreshortened, being integral to the walls 34, 35 but of a larger radius 21. The wall 36 may be shortened by reducing the periphery of the shank 30 on a flat, but it is preferable that it be curved. The bottom walls 37, 38 of the shank edges 31, 32 are also foreshortened either by providing them along a larger radius 22 or by flattening them by reducing the periphery of the shank 30 on a flat. It is preferable that the walls 37, 38 be curved. A diameter 23 through the shank 30 in normal position from the shortened wall 38 to shortened wall 36 or from shortened wall 37 to shortened wall 36 should be just about the same or smaller than the diameter of the aperture 50.

The shank 30 from the walls 37, 38 also has edges tapered outward from the periphery of the shank 30 to serve as a ramp to aid insertion of the bushing 10 into the aperture 50. The shank edges 31, 32 may also have flattened areas 26, 27 serving both as a ramp and to avoid cutting any burrs on the bushing 10 as it is inserted in the aperture 50.

Figure 7:
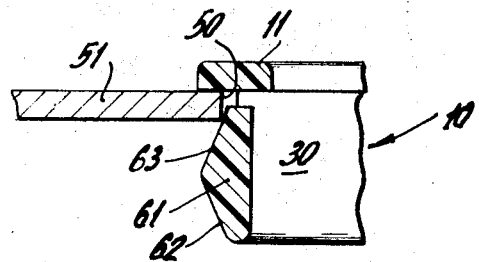
FIG. 7 is a partial section of one form of panel gripping finger for a bushing of the present invention.

In FIG. 7 gripping finger 61 is shown in section wherein the finger 61 is resiliently held in the shank 30 and provided with a ramp 62 to help slide the bushing 10 in the aperture 50 and a locking ramp 63 tapering inward toward the shank 30 from about midposition of the finger 61 to grasp a selected thickness of panel 51.

Figure 8:
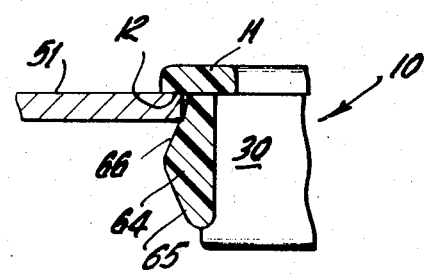
FIG. 8 is a partial section of another form of panel gripping fingers for a bushing of the present invention.

In FIG. 8 a gripping finger 64 is shown in section wherein the finger 64 is resiliently extended backwards from the inner surface 12 of the face flange 11 parallel to the shank body 30. The finger 64 is provided with a ramp 65 tapering outward and a locking ramp 66 tapering inward toward the shank 30 for grasping the panel 51.

Figure 9:
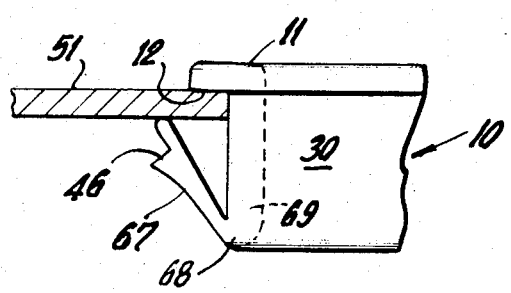
FIG. 9 is a partial section of another form of panel gripping fingers for a bushing of the present invention.

In FIG. 9 the gripping finger 67 is provided with a hinge 68 to the shank 30 which serves as a ramp. The finger 67 may be squeezed into a recess 69 in the shank 30 as shown or lie flush against the shank 30 wall (not shown), engaging the panel 51 between the inner surface of the flange 12 and the shoulder 46 on the finger 67.

The edges 31, 32 of the shank 30 are preferably set back a short distance from the respective end of the curved portions 14, 15.

In use as shown in FIG. 5, a wire 80 is already extended through the aperture 50. In order to engage the bushing 10 over the wire the discontinuity of the bushing must be opened the width of the wire. The wall 36 as shown in FIG. 3 is thinned, aside from the fact that it has a wider arc curvature. The thinned portion 36 opposite the gap 16 acts as a spring hinge allowing the bushing to resiliently flex to admit a wire 80 having a diameter equal to the inside diameter of the bushing 10.

Figure 6:
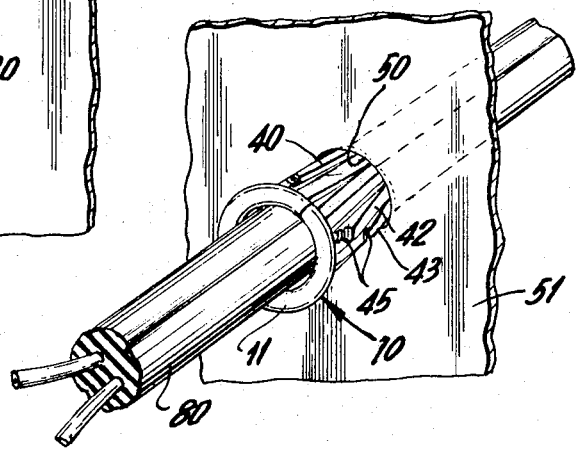
FIG. 6 is a view showing how the bushing of FIG. 5 is inserted into an aperture.

The bushing 10 as shown in FIG. 6 may be slid along the wire 80 or may grasp the wire and the bushing 10 then inserted into the aperture 50 in the panel. The bottom walls 31, 32 of the shank 30 are squeezed together, flexing the entire shank 30 at the wall 36 which again acts as a hinge. When the bottom walls 31, 32 are flexed together, the diameter 23 is shortened and smaller than the aperture 50 diameter. The shank walls 34, 35 are also drawn together to fit into the aperture 50.

Since the shank edges 31, 32 are set back from the ends of the flange curved portion, the bottom walls 37, 38 can easily squeeze together at an angle to narrow the diameter of the shank body 30 so that it can fit into the aperture 50.

The flat arc of the wall 36 as it extends toward the walls 34, 35 also may serve as a ramp for sliding the bushing 10 into the aperture 50 even without compressing the shank edges 31, 32 toward each other. By projecting the bushing 10 into the aperture 50 at an angle with the wall 36 entering the aperture 50 first, the curvature of the wall 36 acts as a ramp drawing the walls 34, 35 together. As soon as the walls 34, 35 are within the aperture 50, a push of the bushing perpendicular to the aperture engages the tapered walls 24, 25 of the shank 30 which have a normal, small diameter 23, the walls 24, 25 act as a ramp to aid the entire bushing 10 to engage the aperture.

The fingers 41, 43 have matched shoulders 45. The fingers 41, 43 have their shoulders 45 spaced furthest apart from the inner surface 12 of the face flange 11, thus the fingers 41, 43 are quick to grasp the walls of the panel 51 and prevent the bushing 10 from popping out during insertion. The fingers 41, 43 being closest to the wall 36 and opposite each other grasp the walls of the panel 51 quickly when the bushing 10 is thrust into the opening wall 36 first. Once a bushing 10 has been inserted the shoulders 45 on the fingers 40, 41, 42, 43 most appropriately spaced from the inner section 12 of the flange 11 grasp the panel 51 between the inner surface of the flange 12 and the appropriate shoulder 45 holding the bushing fast in the aperture. The fingers 40, 42 are usually equidistantly spaced from said shank edges 31, 32 less than 180 degrees apart.

Once engaged in the aperture 50, the flange 11, while not being truly circular, has the appearance of being substantially circular. The major arc portion 13 of the flange 12 is slightly distorted as it is flexed while the curved portions 14, 15 when juxtaposed appear to be a contiguous arc. The major arc portion 13 substantially becomes two half arcs each having the same radius as before.

By providing the curved portions 14, 15 with a radius or radii longer than the radius of the major arc portion 13, the gap 16 is accentuated when the bushing 10 is in normal position since the curved portions 14, 15 extend upward rather than towards each other. The total circumference of the face flange 11 must be matched to the circumference of the aperture 50. The blending of the curve of the curved portions 14, 15 on a radius larger than the major arc portion 13 so that the curved portions 14, 15 juxtapose when the bushing 10 is inserted into the aperture 50 is a matter of reasonable selection of curves and radii to minimize distortion of the round appearance of the flange 11 engaged in the aperture 50. The ends of the flange 11 at the gap 16 must meet on a clean line to give the best appearance of contiguity. The curved portions 14, 15 are preferably symmetrical.

The split bushing of the present invention is for a round panel 51, aperture 50 and has a discontinuous flange 11 which in normal open position comprises an arc portion of about three quarters of a circle and two integral curved portions 14, 15 opposed to each other at the ends of the major arc portion 13. The curved portions have a radius or more than one radius longer than the radius of the major arc portion 13 so that the curved portions 14, 15 which define the discontinuity of the flange 11 in normal position extend upward and away from each other. The total circumference of the flange 11 is equal to the circumference of the aperture 50 plus any overlap into the body and over the edge of the panel 51. The flange 11 in the inserted bushing 10 has its discontinuity juxtaposed which gives the visual appearance of round bushing 10. When a wire 80 is in the bushing 10 any distortion of the bushing is even less obvious visually. The shank 30 is an integral perpendicular discontinuous wall extending from the flange 11. The shank edges 31, 32 are longitudinally aligned along the axis of the body 30, though they are preferably set back a bit from the end portion of the face flange 11. The periphery of the shank when the edges 31, 32 are brought together is less than the periphery of the aperture 50 so that the shank 30 may be easily inserted into the aperture 50. The shank 30 includes fingers 40, 41, 42, 43 and shoulders 45 as grasp means to engage the panel 51 between the portion of the flange 11 that extends beyond the periphery of the aperture 50 on one side of the panel 51 and the shoulders 45 on the fingers 40, 41, 42, 43 on the other side of the panel 51. It is preferable that the shank wall 36 have a flatter curve than the main walls 34, 35 of the shank 30 and the wall 36 be thin so that the wall 36 may act as a hinge when the bushing 10 is compressed from normal position. The gap 16 is preferably diametrically opposite the wall 36 and the curved portions 14, 15 of the flange preferably of equal size to promote symmetry when the bushing 10 is in the aperture 50.

Having thus described certain forms of the invention in some detail, what is claimed is:

1. A split bushing for a round panel aperture comprising, a discontinuous flange, said flange in normal open position comprising a first major arc portion of a circle of one radius, a first curved portion integral to and joined to one end of said first arc portion, said first curved portion having no radius smaller than said radius of said first major arc portion, a second curved portion integral to and joined to the other end portion of said first arc portion, said second curved portion having no radius smaller than said radius of said first major arc portion, said first curved portion ending at said flange discontinuity, said second curved portion ending at said flange discontinuity, said curved portion ends normally spaced apart when said bushing is not engaged in said aperture, said first and second curved portions adapted to be juxtaposed to each other when said bushing is fully inserted in said aperture, said flange having a substantially round appearance when said bushing is fully inserted in said aperture, the periphery of said flange being larger than the periphery of said aperture, a discontinuous shank, said shank integral to and extending from said flange and normally perpendicular thereto, a first shank edge, a second shank edge, said first and second shank edges ending at said shank discontinuity, said shank and flange discontinuities substantially contiguous, said periphery of said shank smaller than the periphery of said aperture when said shank edges are in close position opposed to each other, said periphery of said shank smaller than said periphery of said flange, grasp means on said shank adapted to engage the wall of said panel that surrounds said aperture between said flange and said grasp means on said shank, and said flange and shank adapted to be flexed apart at said discontinuity whereby a selected object may be engaged within said bushing passing through said discontinuity.

2. The invention of claim 1 wherein said wall of said shank is of lesser thickness opposite said discontinuity.

3. The invention of claim 2 wherein at least said shank wall and adjacent flange areas are resilient.

4. The invention of claim 2 wherein said flange and shank discontinuities are substantially aligned along a longitudinal axis of said bushing, at least said shank wall and adjacent flange areas are resilient, and said first and second curved portions are symmetrical.

5. The invention of claim 1 wherein said flange and shank discontinuities are substantially aligned along a longitudinal axis of said bushing.

6. The invention of claim 1 wherein first and second shank edges include a ramp toward said flange.

7. The invention of claim 1 wherein first and second shank edges include a flat on their periphery.

8. The invention of claim 1 wherein the grasp means are at least a pair integral of resilient oppositely spaced fingers tapering outwardly from the periphery of said shank and including grasp means.

9. The invention of claim 8 wherein at least a pair of said spaced fingers have matched shoulders.

10. The invention of claim 8 wherein said fingers have a selection of matched shoulders.

11. The invention of claim 1 wherein said grasp means includes at least a pair of resilient spaced fingers at least one of such fingers tapers outwardly beyond the periphery of said shank part of the distance along said shank then tapers inward toward the periphery of said shank.

12. The invention of claim 1 wherein said grasp means includes at least a pair of resilient spaced fingers at least one of such fingers extending freely outward from the end of said shank away from said flange, said at least one finger having at least one shoulder.

13. The invention of claim 1 wherein said at least one finger is adapted to recess in said shank when engaged in said aperture.

14. The invention of claim 1 wherein the grasp means are at least a pair of integral resilient spaced fingers extending rearward from the flange, said at least one finger tapering beyond the periphery of said shank part of the distance along said shank then tapered inward to the periphery of said shank.

15. The invention of claim 1 wherein said first and second curved portions are gapped away from each other in open position.

16. The invention of claim 15 wherein said first and second curved portions are symmetrical.

17. The invention of claim 1 wherein said grasp means include a pair of integral resilient spaced fingers having at least a pair of matched shoulders said fingers equidistantly spaced from said first and second shank edges and said fingers being less than 180 degrees apart.

18. The invention of claim 17 including a second pair of spaced fingers equidistantly spaced from said first and second shank edges outward of said first pair of fingers said second pair of fingers having at least one pair of matched shoulders spaced further away from said flange.

19. The invention of claim 1 wherein the total circumference of said flange is matched to the circumference of said aperture.

20. The invention of claim 1 wherein said first and second curved portions are blended to juxtapose when said bushing is fully inserted in said aperture.

21. The invention of claim 1 wherein said major arc portion is divided to form two substantially equal arc portions each having approximately the same radii when said bushing is engaged in said aperture.

References Cited
UNITED STATES PATENTS

| | | | |
|---|---|---|---|
| 2,291,430 | 7/1942 | Ingersoll | 174—153GX |
| 2,424,757 | 7/1947 | Klumpp | 174—153G |
| 3,057,001 | 10/1962 | Rapata | 174—153GX |
| 3,272,461 | 9/1966 | Larkin | 174—153GX |
| 3,366,356 | 1/1968 | Fisher | 248—56 |

DONALD A. GRIFFIN, Primary Examiner

U.S. Cl. X.R.
174—153; 248—56